3,419,529
STABILIZATION OF OXYMETHYLENE
COPOLYMERS
Joseph D. Chase and Peter P. Gesting, Corpus Christi, Tex., assignors to Celanese Corporation, a corporation of Delaware
No Drawing. Filed Sept. 29, 1964, Ser. No. 400,192
2 Claims. (Cl. 260—67)

ABSTRACT OF THE DISCLOSURE

Disclosed herein is an improved process for the preparation of stabilized oxymethylene copolymers. In accordance with the teaching of this specification a ground mixture of oxymethylene polymer and a hydrolysis medium is heated to hydrolysis conditions and then hydrolyzed during a conveying step.

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the molecules, the polymer will have less stability than if the molecule ends are relatively stable to degradation.

While the subject invention will be described with reference to oxymethylene copolymers it should not be limited thereto as the principles of the invention are applicable to other polymers having appropriate stable and unstable units.

In general, the invention involves the stabilization of a polymer having stable and unstable units in its molecules by treating the polymer in such a way as to selectively degrade the polymer and remove unstable units from its molecules and thereafter recovering the polymer.

A preferred embodiment of this invention relates to a method of stabilizing a copolymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention relates to subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 50 and preferably at least 80% of the polymeric chains of the molecules of the treated polymer have comparatively stable, or comparatively thermal-resistant, units in terminal positions.

A preferred embodiment of the invention involves accomplishing the terminal degradation of the polymer molecules by a hydrolysis reaction while a slurry of solid particles of the polymer is in contact with a liquid hydrolysis medium and while the slurry is being transported or conveyed to a further stage of polymer treatment with the conveying being accomplished without substantial backmixing. Preferably the polymer particles are immersed in the liquid hydrolysis medium during the reaction. It is also preferred that the liquid medium be at a temperature such that the polymer is swollen but does not agglomerate, become tacky or dissolve in the hydrolysis medium.

A particularly suitable type of equipment for continuously conveying the slurry while carrying out the chemical hydrolysis reaction is an ordinary non-backmixing screw conveyor.

Oxymethylene polymers, having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and will not induce undesirable reactions. In a preferred embodiment the polymers have a chain containing between about 85 and 99.6 mol percent of the oxymethylene units interspersed with between about 0.4 and about 15 mol percent of the —O—R units. The preferred copolymers are those containing oxymethylene and oxyethylene groups, such as copolymers of trioxane with dioxolane or with ethylene oxide. In a preferred embodiment R may be, for example, an alkylene or substituted alkylene group containing at least two carbon atoms.

Among the copolymers which may be utilized in accordance with this aspect of the invention are those having a structure comprising recurring units having the formula

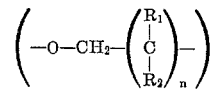

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

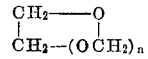

where $n$ is an integer from zero to 2.

Examples of preferred polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal; paraldehyde; tetrahydrofuran and butadiene monoxide.

Other oxymethylene polymers and methods of preparation therefor are disclosed by Kern et al. in Angewandte Chemie 73(6) 177–186 (Mar. 21, 1961) including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc. These and other polymers are disclosed by Sitting in "Polyacetals—What You Should Know." Petroleum Refiner 41(11), pp. 131–170, November 1962.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. Patent application Ser. No. 229,715 now abandoned, filed Oct. 10, 1962 by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers are suitable for making molded articles, films, sheets, fibers, pipes, etc.

These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of $\alpha$-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

Any of the known catalysts suitable for the polymerization of trioxane itself or with other materials may be used to make suitable copolymers.

Preferred catalysts are cationic catalysts including such inorganic fluorine-containing catalyst as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride and compounds containing these materials such as boron fluoride coordinate complexes with organic compounds, particularly those in which oxygen or sulfur is the donor atom.

Other suitable catalysts include thionyl chloride, fluorosulfonic acid, methane sulfone acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as the previously mentioned boron fluoride coordinate complexes with organic compounds.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505, 2,989,506, 2,989,507, 2,989,508, 2,989,509, all of which are by Donald E. Hudgin and Frank M. Berardinelli; 2,989,510, by George J. Bruni; and 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture such as may be present in the commercial grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a reaction zone. The temperature in the reaction zone may vary from about 0° C. to about 120° C. The period of reaction may vary from about 5 minutes to about 72 hours. Pressures from subatmospheric to about 100 atmospheres, or more may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reactor it is desirable to neutralize the activity of the polymerization catalyst since prolonged contact with the catalyst degrades the polymer. The polymerization product may be treated with an aliphatic amine, such as tri-n-butylamine or triethylamine, in a stoichiometric excess over the amount of free catalyst in a reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

By the use of techniques which are conducive to the production of polymers of high molecular weight and by the incorporation of comonomers, as described above, it has been possible to produce polymers having oxymethylene groups directly attached to each other which are relatively stable against thermal degradation. By further incorporation of chemical stabilizers, as described below, it has been possible to stabilize oxymethylene polymers so that their degradation rate is less than about 0.1 weight percent per minute for most of the polymer mass when the polymer is maintained in an open vessel in a circulating air oven at 230° C. However, despite this high stability for most of the polymer mass, it has been difficult to reduce the initial degradation rate of the polymer (at 230° C. in air) to a satisfactory level. It has been found that a polymer may be reduced to a degradation rate (at 230° C. in air) for most of its mass of less than 0.1 weight percent per minute while the initial 0.5 to 20 weight percent of the polymer has a higher degradation rate (at 230° C. in air) of the order of between 1 and 0.5 weight percent per minute. For the purpose of convenience the degradation rate (at 230° C. in air) for most of the polymer mass is hereinafter designated as the "base" degradation rate.

During molding processes, oxymethylene polymers are generally heated to temperatures between about 180° and about 230° C. for relatively short periods between about 5 seconds and about 5 minutes. Even where the base degradation rate (at 230° C. in air) has been reduced to below 0.1 weight percent per minute, it has been found that molded products have uneven surface characteristics, due to gassing, unless the initial degradation rate is also reduced to below 0.1 weight percent per minute.

The liquid hydrolysis medium preferably should contain water in sufficient amount to cause the polymer to remain undissolved at the temperature of the reaction. In most cases the amount of water present may be varied between a range of about 40 to 100% and preferably between about 75 to about 95% based on the weight of the total liquid medium.

In certain embodiments it may be desired to replace all or part of the water by a water soluble, normally liquid, non-acidic organic compound having an oxygen atom directly bonded to a carbon atom. When the oxygen atom is a hydroxy oxygen atom the organic material may be used to replace all or part of the water. When the oxygen atom is an etheric oxygen atom or a non-terminal carbonyl oxygen atom such as a ketone oxygen atom or an ester oxygen atom, the organic material must be used in conjunction with water and/or the hydroxy oxygen atom organic-containing material.

The organic hydroxy containing material may, for example, be an alcohol. Suitable alcohols include aliphatic alcohols and preferably those containing from 1 to 20 carbon atoms including methyl alcohol, ethyl alcohol, n-propyl alcohol, isopropyl alcohol, n-butyl alcohol, isobutyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearyl alcohol, beta-methoxyethyl alcohol, etc. Other suitable alcohols include the aromatic alcohols, preferably those having 1 to 20 carbon atoms, including benzyl alcohol, alpha-phenylethyl alcohol, beta-phenylethyl alcohol, o-methylbenzyl alcohol, diphenylcarbinol, triphenylcarbinol, o-ethylbenzyl alcohol, p-propylbenzyl alcohol, 2-methylolbenzyl alcohol, 3-ethylolbenzyl alcohol, 3-methylol alpha-phenylethyl alcohol, etc.

Other suitable alcohols include cycloaliphatic alcohols, preferably those having from 1 to 20 carbon atoms including cyclopentyl carbonyl dicyclohexyl-1,1'-diol, 1,2- dimethylcyclopentane-1,2-diol, cyclopentyl alcohol, 1,2-dimethylcyclopentyl alcohol, 1-methylcyclohexyl alcohol, 3-methylcyclohexyl alcohol, 2-propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene glycol, 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

The organic materials containing a ketone oxygen atom preferably contain from 2 to about 20 carbon atoms and may include acetone, methylethyl ketone, methyl n-propyl ketone, methyl isopropyl ketone, diethyl ketone, hexanone-2, hexanone 3, acetylacetone, acetonylacetone, di-n-propyl ketone, etc.

Suitable ester oxygen containing materials preferably contain from 2 to about 20 carbon atoms and may include methyl acetate, ethyl acetate, n-propyl acetate, methyl formate, ethyl formate, n-propyl formate, n-butyl formate, isopropyl acetate, n-butyl acetate, sec-butyl acetate, tert-butyl acetate, isobutyl acetate, ethyl propionate, ethyl n-butyrate, methyl isobutyrate, n-propyl valerate, ethyl caproate, ethyl laurate, n-propyl palmitate, ethyl stearate, etc.

Suitable etheric oxygen containing materials preferably contain from 2 to about 20 carbon atoms and may include dimethyl ether, diethyl ether, di-n-propyl ether, di-isopropyl ether, di-n-amyl ether, methylethyl ether, methyl n-propyl ether, methyl isopropyl ether, ethyl n-propyl ether, methylal, m-dioxane, p-dioxane, trioxane, etc.

The terminal units of the oxymethylene polymer are often hydroxy-substituted oxymethylene

(—O—CH$_2$—OH)

units and detachment of an oxymethylene group from the polymer molecule by the hydrolysis reaction has the effect of shifting the hydrogen atoms of the hydroxyl group to the oxygen atom of the next adjacent oxymethylene group.

When oxymethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the original copolymer from which it was derived.

During the hydrolysis reaction a portion of the copolymer is decomposed to formaldehyde resulting in a weight loss of copolymer. It is believed that the formaldehyde is formed by the successive detachment of the terminal oxymethylene units from the ends of the polymer chain. The hydrolytic degradation of unstable groups is complete when the weight loss substantially ceases.

It has been found that the products of the selective hydrolysis treatment, after substantially constant weight is achieved, are also extremely stable against attack at the reaction conditions. The treatment produces a weight loss at a first, comparatively high, rate, which, after the treatment continues for a suitable period of time, drops to a rate of less than 20% of the first rate loss, and, most preferably, between 0.1% and 5% of the first rate loss. Thus, in a preferred embodiment, the polymer is subjected to the reaction conditions until it achieves substantially constant weight. Thus, an oxymethylene copolymer, having had the hydrolytic treatment is not only thermally stable but is also extremely stable against such further hydrolytic treatment even at conditions more severe than those of the treatment. This is true despite the fact that the polymer still has a substantial content of internal oxymethylene units which are normally subject to degradation by alkaline hydrolysis unless protected by suitable end groups resistant to degradation under such conditions.

In a preferred embodiment the polymer is subjected to the hydrolysis under non-acidic, preferably alkaline conditions, conditions where the pH is at least 7. The alkaline material is preferably water soluble, or soluble in the organic solvent material, and may be a strongly basic hydroxide such as the hydroxide of an alkali metal, or alkaline earth metal, or it may be the salt of a strong base and weak acid, or it may be ammonia or an organic base, such as an amine or an amidine.

Suitable alkaline materials include ammonium hydroxide, sodium hydroxide, potassium hydroxide, sodium carbonate, sodium acetate, hexamine, triethanolamine, tripropylamine, trimethylguanidine, trimethylamine, tributylamine, etc.

In a preferred embodiment the amount of alkaline material present in the chemical reaction is from 0.001 weight percent to about 10.0 weight percent, most preferably between about 0.001 weight percent and about 1.0 weight percent. When no alkaline material is used it may be desirable to have the reaction take place in a buffered system since some of the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

The hydrolysis medium is suitably used in amounts between about 5 and about 25 pounds per pound of copolymer and preferably between about 7.5 and about 10 pounds per pound of copolymer.

The hydrolysis reaction may take from about 15 seconds to about 1 hour with from about 1 to 20 minutes being preferred.

In general, the hydrolysis reaction should continue and should selectively remove the comparatively thermally unstable terminal units until at least one of the following events occurs.

(1) The weight loss rate of the treated polymer is below 0.1 weight percent per minute.

(2) At least 95% of the polymer molecules which were terminated by the comparatively thermally unstable terminal units, are terminated by comparatively stable units having carbon-to-carbon bonds derived from the —O—R— units.

(3) A disc of the treated polymer having a thickness of 50 mils will lose no more than about 1% of its weight in a ½ hour when subjected to 50 weight percent sodium hydroxide at 145° C.

(4) The weight loss rate drops to between about 0.1 and about 5% of the first initial weight loss rate. The above weight loss rates are stated in terms of weight lost per minute when the polymer is maintained in an open vessel in a circulating air oven at 230° C.

The hydrolysis process is further described in U.S. Patent No. 3,174,948 issued on Mar. 23, 1965, to Wall, Smith and Fisher, in U.S. Patent No. 3,319,623 issued on Nov. 23, 1965, to Berardinelli and U.S. patent application, Ser. No. 400,585, filed Sept. 30, 1964 by Smith and Heinz. These patents and applications are assigned to the same asignee as the subject application.

In a preferred embodiment it is generally desirable to incorporate one or more thermal stablizers into the copolymer in order to bring its thermal degradation even lower. The proportion of stabilizer incorporated depends upon the specific stabilizer used. A proportion between about 0.05 and 10 weight percent (based on the weight of polymer) has been found to be suitable for most stabilizers.

One suitable stablizer system is a combination of (1) an antioxidant ingredient, such as phenolic antoxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stablizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrollidone, hydrazides, compounds having 1 to 6 amide groups, proteins, compounds having tertiary amine and terminal amide groups, compounds having amidine groups, cycloaliphatic amine compounds and aliphatic acylureas. Other suitable stablizers are described in the above mentioned kern et al. and Sittig articles and in the references cited therein.

The stabilizers may be incorporated into the polymer by dissolving both the polymer and the stablizer in a common solvent and thereafter evaporating the solution to dryness. Alternatively, the stablizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stablizers is by blending a dry solid stabilizer into the plastic polymer, while the latter is being kneaded as on heated rolls or through an extruder.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 1 to 30 times (preferably from about 4 to about 20 times) its weight of solvent medium, based on the weight of the mixture. The mixture of polymerization product and quench medium is wet ground to break up the larger particles of polymer and the slurry (having from about 2 to about 20 wt. percent of solids) is suitable for hydrolysis. From about 10 to about 8000 p.p.m. of a basic catalyst deactivation agent, such as ammonia (based on the weight of solid polymer) are added.

The slurry is heated unitl it reaches hydrolysis conditions, e.g. a temperature between about 130° C. and about 148° C., and a presure of at least the autogeneous pressure of the solvent system. The slurry is transferred or conveyed without substantial backmixing in a screw conveyor while maintaining these conditions. Under such conditions the polymer swells but does not dissolve in the hydrolysis medium. It is preferred that a major portion of the period during which the mixture is kept at hydrolysis conditions occurs while the mixture is being transferred or conveyed without substantial backmixing.

The carrying out of the hydrolysis reaction while continuously transporting, without backmixing, a slurry of solid polymer particles immersed in the liquid medium but not dissolved therein, makes possible the recovery of polymer containing substantially less liquid at a relatively rapid rate. This in turn expedites the steps of filtering and drying the polymer.

The process of this invention is suitably carried out at a temperature range such as that given above, e.g. 130 to 148° C., which is above that at which the preparation of the polymer by polymerization e.g. with an acidic catalyst such as one comprising boron trifluoride, is accomplished. Moreover, as brought out above, the polymer treated in accordance with this invention has usually been previously quenched with a catalyst deactivation agent, e.g. an aqueous and/or alkaline wash liquid as disclosed in Patent No. 2,989,509, to neutralize or deactivate the acidic catalyst. Thus, substantially no polymerization takes place during the hydrolysis reaction. In addition, as discussed previously, the reaction is preferably carried out in the presence of a hydroxy compound such as water or an alcohol which is usually not present during the polymerization reation.

In accordance with one embodiment of the invention, ground polymer obtained from the polymerization zone and containing catalyst is slurried in a liquid medium capable of both quenching the catalyst and hydrolyzing the polymer (usually at a higher temperature) as brought out above. If the polymer contains unreacted trioxane, this is taken into account in deciding what the composition of the added liquid should be. Thus if the liquid medium is intended to be aqueous trioxane and the polymer contains unreacted trioxane, the liquid added to the quenching zone ned not contain as high a percentage of trioxane as desired in the liquid medium. The slurry is then preheated in a hydrolysis preheating zone to the temperature at which hydrolysis proceeds at the desired rate and the slurry is concentrated by removing some of the liquid medium, e.g. in a liquid cyclone which is cycled partially to the hydrolysis preheating zone and partially to the quenching zone. A cyclone is a piece of equipment generally composed of a cylindrical section at the top and a conical section at the bottom. A stream containing solid particles dispersed in a fluid, e.g. a slurry, is introduced tangentially near the top of the cyclone at a fairly high velocity. The fact that the solid particles are of higher density than the fluid in which they are dispersed causes them, due to a differential of centrifugal force, to concentrate near the periphery of the equipment as they move down due to gravity. In the conical section of the equipment, the solid particles are moved by gravity to the outlet of the equipment near the vertex of the conical section at the botom. The equipment thus allows for the withdrawal of a stream containing a higher concentration of solids than that entering the equipment, while a stream containing a lower concentration of solids is withdrawn from a vertex at the interior of the cylindrical section.

While a cyclonic type separator is suitable, any other type of solid-separating unit can be used as long as it can be operated under pressure. It is not necessary that the unit be completely filled with liquid, but the upper portion should contain a vapor or inert gas space suitable for maintaining pressure on the system. Since the polymer particles in the system are quite dense a simple settling tank is satisfactory. Preferably the settling tank has a conical or sloping bottom that would channel the polymer solids into an outlet port.

A suitable range of proportions of liquid medium which may be removed in the concentration step is, for example, from 0 to 75 wt. percent of the total liquid medium in the slurry being concentrated. The concentrated preheated slurry is then passed into a hydrolysis zone, e.g. a horizontal screw conveyor, wherein hydrolysis temperatures are maintained while continuously transporting the slurry with substantially no backmixing. After sufficient residence time in the hydrolysis zone, the slurry is passed into a cooling zone wherein it is cooled to a temperature below that at which hydrolysis takes place at an appreciable rate. The slurry is then filtered to obtain polymer which is washed and dried, and filtrate which is treated in a solvent recovery plant to obtain liquid medium for recycle. Part of the wash liquid may be treated to recover useful components, while part may be recycled to the quenching zone if desired.

The relatively low concentration of polymer in the slurry present in the quenching zone and preheating zone make possible better heat exchange for heating the slurry up to hydrolysis temperatures, while the greater concentration of polymer in the hydrolysis zone has the effect of reducing the solvent recovery requirements in connection with the liquid medium separated from the polymer during the filtration and washing steps.

A preferred continuous process preferably uses a reactor quench tank into which is placed ground polymer from the polymerization zone, hydrolysis liquid medium, including both liquid from the recovery plant and make-up liquid, and a basic catalyst deactivating agent, such as ammonia. The slurry is transferred to a prehydrolysis heat exchanger where it is heated to hydrolysis temperatures. From the exchanger, the slurry is transferred to a liquid cyclone for concentration of the slurry. Liquid separated from the cyclone may be recycled partially to the quench tank and partially to the prehydrolysis heat exchanger. The reduction of the polymer concentration of the slurry leaving the quench tank before it enters the heat exchanger, which is accomplished by recycling part of the liquid from the cyclone to such slurry, has the effect of improving the heat transfer properties of the slurry and increasing the efficiency of the heat exchanger.

Concentrated slurry from the cyclone is transferred to a screw conveyor where the polymer is hydrolyzed while being continuously conveyed, without substantial backmixing, to a cooler. Hydrolysis temperatures are maintained in the screw conveyor by heat exchange medium, e.g. steam which circulates through a jacket and possibly through the screw member of the equipment. Steam condensate is then withdrawn.

The temperature of the slurry is lowered in the cooler to a point below that at which any appreciable hydrolysis occurs, by means of a cooling medium, e.g. water. The cooled slurry is then transferred to a product filter where the polymer product is filtered and washed. Filter product is removed and sent to the drier. The mother liquor is withdrawn and is sent to the recovery plant where impurities (such as formaldehyde produced by the hydrolysis) are removed and the liquor is brought to the proper composition for introduction into the quench tank. Wash liquor is withdrawn and is sent to the recovery plant. If desired, part of the wash liquor may be recycled to the quench tank.

In a preferred embodiment, aqueous trioxane is preferably the quenching and hydrolysis medium since this takes advantage of the presence of unreacted trioxane in the polymer from the polymerization zone and simplifies the solvent recovery requirements of the system, there being in that case no additional organic compound which must be recovered.

The temperature of the hydrolysis treatment is below the solution temperature of the polymer in the liquid hydrolysis medium and is preferably between about 130 and 148° C. At higher temperatures within this range the hydrolysis treatment is conducted under sufficient pressure to maintain the hydrolysis medium in a liquid phase. A preferred temperature range is between about 134 and about 136° C.

The swell temperature of the polymer in the liquid medium may be determined by placing a mixture of the polymer and the liquid in a glass ampul and sealing. The ampul is then placed in an oil bath which is heated at the rate of 1 to 2 degrees per minute while mechanically agitating the ampul. One end of the ampul is alternately raised and lowered allowing the mixtures to flow from one end to the opposite end of the ampul. During heating the physical appearance is observed constantly by visual inspection. The point at which an increase in the size of the polymer particles is visually observed is considered to be the initial swell temperature. The maximum swell generally occurs about 1 to 2° below the agglomeration temperature, i.e., the temperature at which the polymer becomes tacky and adheres to the walls of the ampul instead of flowing freely from one end to the other.

Example

A copolymer of trioxane and ethylene oxide is continuously prepared from a monomeric mixture containing 2.0 wt. percent of ethylene oxide using a boron trifluoride polymerization catalyst in a polymerization zone and the copolymer is continuously ground and transferred to a quench tank together with sufficient aqueous trioxane and ammonia as liquid quenching and hydrolysis medium to yield a slurry containing 10 wt. percent of polymer dispersed in a liquid medium composed of about 20 wt. percent of troxane and 80 wt. percent of water, and also containing 0.05 wt. percent of ammonia. The slurry is continuously agitated in the quench tank and is continuously removed therefrom at a rate such that its residence time in that tank is about 30 minutes at 50° C. From the quench tank, the slurry is continuously passed through a heat exchanger where it is heated to 138° C. and where the polymer concentration is reduced to about 7 wt. percent of the slurry as a result of the addition of recycle liquid from the cyclone to the slurry. The slurry is then passed through the cyclone where the concentration of polymer in the slurry is increased to about 18 wt. percent. The separated liquid is recycled to the quench tank and the exchanger. The concentrated slurry is then passed through a screw conveyor where its temperature is maintained at 138° C. during a residue time of about 15 minutes, and where the major portion of the hydrolysis reaction is accomplished. From the screw conveyor, the slurry is passed to a cooler where it is quickly cooled to a temperature of 60° C. and then to a filter where the polymer is filtered and washed with 5 parts by weight of water per part of polymer. The filtered polymer containing about 60 percent liquid is sent to a dryer from which dry polymer having a high degree of base stability is obtained.

After drying, the polymer is blended with 0.5 wt. percent of 2,2'-methylene bis(4-methyl-6-tertiarybutyl phenol) and 0.1 wt. percent of cyanoguanidine, based on the weight of the mixture, to yield a final stabilized polymer composition having an average thermal degradation rate of 0.018 wt. percent/min. when heated for 45 minutes at 230° C. in an open vessel in a circulating air oven.

While the chemical treatment has been described primarily as one of hydrolysis wherein the chemical reactant comprises water, it is understood of course that if an alcohol is used in place of water the reaction may be described as one of "alcoholysis" which term is to be included in the term "hydrolysis."

In addition to oxymethylene copolymers containing unstable end portions and stable portions as part of the same molecule, e.g. as is the case with copolymers of trioxane and cyclic ethers containing adjacent carbon atoms, the process of this invention is also suitable for the treatment of polymers made up of a mixture of stable and unstable whole molecules, e.g., such as occurs when an oxymethylene homopolymer mass is treated to "cap" only a portion of the ends of the molecules with such stable groups as ether groups, e.g., methoxy groups. In this case, the mass of polymers is made up of stable molecules having both ends capped with such stable groups, and unstable molecules with at least one end remaining uncapped with a comparatively unstable end group such as an acetate end group. The treatment will thus result in the complete degradation of the unstable molecules leaving a residue of stable molecule.

It is to be understood that the foregoing detailed description is given merely by way of illustration and that many variations may be made therein without departing from the spirit of our invention.

The embodiments of the invention in which an exclusive property or privilege is claimed are defined as follows:

1. In the process for the stabilization of a moldable oxymethylene polymer having at least one chain containing
    (A) from about 85 to 99.9 mol percent of oxymethylene units interspersed with
    (B) from about 0.1 to about 15 mole percent of —O—R— units wherein R is a divalent radical containing at least two carbon atoms directly linked to each other and positioned in the chain between the two valences with any substituents in said R radical being inert,
    at least part of the terminal units of the molecules of said polymer being comparatively thermally unstable hydroxy-substituted oxymethylene units of higher susceptibility to thermal degradation than terminal units derived from said —O—R— units,
    said process comprising selectively removing said comparatively thermally unstable terminal units in the presence of a liquid hydrolysis medium,
    the improvement wherein solid particles of said polymer are immersed in said liquid hydrolysis medium and said mixture is conveyed in a screw conveyor without substantial backmixing, said reaction occurring substantially during said conveying step.

2. A process for preparing stabilized moldable oxymethylene polymers comprising polymerizing suitable monomers to yield a polymerization product comprising an oxymethylene polymer having at least one chain containing
    (A) from about 85 to 99.9 mol percent of oxymethylene units interspersed with
    (B) from about 0.1 to about 15 mol percent of —O—R— units wherein R is a divalent radical containing at least two carbon atoms directly linked to each other and positioned in the chain between the two valences with any substituents in said R radical being inert,
    at least part of the terminal units of the molecules of said polymer being comparatively thermally unstable hydroxy-substituted oxymethylene units of higher susceptibility to thermal degradation than terminal units derived from said —O—R— units,
    quenching said polymerization product in a hydrolysis medium,
    grinding the mixture of polymerization product and hydrolysis medium to obtain a particle size that can be easily hydrolized,
    heating the ground mixture to hydrolysis temperatures, and immediately conveying said mixture in a screw conveyor, without substantial back-mixing, to a separator.

References Cited

UNITED STATES PATENTS

| | | | |
|---|---|---|---|
| 3,174,948 | 3/1965 | Wall et al. | 260—67 |
| 3,219,623 | 11/1965 | Berardinelli | 260—67 |
| 3,254,053 | 5/1966 | Fisher et al. | 260—67 |
| 3,318,848 | 5/1967 | Clarke | 260—67 |
| 3,337,504 | 8/1967 | Fisher | 260—67 |

LEWIS GOTTS, *Primary Examiner.*

L. M. PHYNES, *Assistant Examiner.*

PO-1050
(5/69)

UNITED STATES PATENT OFFICE
CERTIFICATE OF CORRECTION

Patent No. 3419529          Dated June 27, 1969

Inventor(s) Joseph D. Chase and Peter P. Gesting

It is certified that error appears in the above-identified patent and that said Letters Patent are hereby corrected as shown below:

In the specification, Column 6, line 45, the word "oxymethylene" should read -- oxyethylene --.

In Column 7, line 68, the patent reading "U.S. Patent No. 3,319,623" should read -- U.S. Patent No. 3,219,623 --.

In Column 11, line 31, the word "residue" should read -- residence --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents